US011481308B2

(12) United States Patent
Keneally et al.

(10) Patent No.: US 11,481,308 B2
(45) Date of Patent: Oct. 25, 2022

(54) SYSTEMS AND METHODS FOR DETERMINING AN APPLICATION QUALITY INDEX

(71) Applicant: Intuit Inc., Mountain View, CA (US)

(72) Inventors: Jarred I. Keneally, Mountain View, CA (US); Manas Kumar Mukherjee, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 412 days.

(21) Appl. No.: 16/751,648

(22) Filed: Jan. 24, 2020

(65) Prior Publication Data
US 2021/0232484 A1    Jul. 29, 2021

(51) Int. Cl.
*G06F 11/00* (2006.01)
*G06F 11/34* (2006.01)
*G06F 17/18* (2006.01)
*G06F 9/54* (2006.01)
*G06N 20/00* (2019.01)

(52) U.S. Cl.
CPC ............ *G06F 11/3495* (2013.01); *G06F 9/54* (2013.01); *G06F 11/3452* (2013.01); *G06F 17/18* (2013.01); *G06N 20/00* (2019.01)

(58) Field of Classification Search
CPC ............ G06F 11/3452; G06F 11/3476; G06F 11/3495
See application file for complete search history.

(56) References Cited

U.S. PATENT DOCUMENTS

| 10,318,727 | B2 * | 6/2019 | Kimura | G06F 21/552 |
| 10,511,690 | B1 * | 12/2019 | Chatterjee | H04L 67/02 |
| 11,126,406 | B1 * | 9/2021 | Aggarwal | G06F 8/33 |
| 2013/0138801 | A1 * | 5/2013 | Maralack | G06F 11/3495 |
| | | | | 709/224 |
| 2013/0253992 | A1 * | 9/2013 | Pyrlina | G06Q 10/06 |
| | | | | 705/7.36 |
| 2015/0220376 | A1 * | 8/2015 | Srivastava | G06F 11/327 |
| | | | | 714/37 |
| 2015/0222504 | A1 * | 8/2015 | Srivastava | G06F 11/3419 |
| | | | | 709/224 |

(Continued)

*Primary Examiner* — Elmira Mehrmanesh
(74) *Attorney, Agent, or Firm* — DLA Piper LLP (US)

(57) ABSTRACT

A computer-implemented method for determining an Application Quality Index (AQI) Score of a software-as-a-service (SAAS) multi-tenant application to a SAAS system is provided. The method may be performed on a computing device executing a processor. The method may include accessing data at a data repository. The accessed data includes at least connection/disconnection data and API error data of the SAAS multi-tenant application. The method also includes processing the accessed data to generate two or more sub-indexes. The two or more sub-indexes includes at least a first sub-index based on the connection/disconnection data and a second sub-index based on the API error data. The first sub-index is assigned a weighted value based on content of the connection/disconnection data and the second sub-index is assigned a weighted value based on content of the API error data. The method also includes generating the AQI based on the weighted value of the two or more sub-indexes, sending the generated AQI to the SAAS multi-tenant application, and receiving an update to the SAAS multi-tenant application based on the generated AQI.

14 Claims, 5 Drawing Sheets

(56) References Cited

U.S. PATENT DOCUMENTS

| | | | |
|---|---|---|---|
| 2015/0358391 A1* | 12/2015 | Moon | G06F 11/3006 |
| | | | 709/224 |
| 2017/0004413 A1* | 1/2017 | Flores | G06F 16/2365 |
| 2017/0235662 A1* | 8/2017 | Leask | G06F 11/302 |
| | | | 717/125 |
| 2018/0314622 A1* | 11/2018 | Lowe | G06F 9/44526 |
| 2020/0097338 A1* | 3/2020 | Dhondse | G06N 3/088 |
| 2020/0409831 A1* | 12/2020 | Balasubramanian | ......... |
| | | | G06F 11/3688 |

* cited by examiner

SYSTEMS AND METHODS FOR DETERMINING AN APPLICATION QUALITY INDEX

The present disclosure relates to software as a service (hereinafter "SAAS") system. More particularly, this disclosure relates to determining an application integration index based on the quality of integration of a SAAS multi-tenant application to the SAAS system.

BACKGROUND SECTION

Multi-tenant applications are typically configured to provide additional services to one or more SAAS systems (e.g., online service or software products). The applications are characterized based on their quality of integration with the commercial online products. For example, the commercial online product offers a set of functions and procedures allowing the creation of multi-tenant applications that access the features or data of a SAAS application, or other SAAS service.

Currently, there exists little ability to determine the quality of integration of the multi-tenant applications to the SAAS system, a SAAS application, or any other SAAS service. Typical SAAS systems have an inability to aggregate the relevant data and normalize the aggregated data to determine a quality index. This is often due to the complex historical data associated with the application's interaction with the SAAS system, the SAAS application, or other SAAS service. Without a quality index, a multi-tenant application is unable to effectively determine how to improve the application's integration with the SAAS system.

Accordingly, there is a need and desire to analyze complex historical data associated with an application's integration to the system and determine an application integration index based on the quality of the integration.

DETAILED DESCRIPTION

Embodiments described herein are configured to determine an application integration index for a multi-tenant application in a SAAS system. Data associated with an application is received from one or more data sources, which is accessible by a processor. The received data is processed to generate a sub-index, which can represent categories of the received data. The sub-index is assigned a weighted value based on the category of the processed data. The processor may generate an Application Quality Index (AQI) based on the weighted value of the sub-index. In some embodiments, the generated AQI may be accessed to rank the multi-tenant application with respect to similar multi-tenant applications made available in a digital application distribution platform. In some embodiments, the AQI may be accessed to suggest areas of modification to improve the multi-tenant application's integration, and subsequently the AQI.

In some embodiments, a statistical learning model is implemented to dynamically determine a weighted value of the sub-index. The areas of modification can include, for example, areas for improving customer retention, or product engagement. Due to a variety of user types and the complex nature of a SAAS system, existing human intervened methods or management systems are not be able to analyze the complex historical data associated with the multi-tenant application's interaction with the SAAS system. Without the presently disclosed system, application developers are unable to assess how to improve the multi-tenant application's integration with the SAAS system.

Embodiments described herein are also configured to improving the overall functionality of the SAAS system. An improved version of the multi-tenant application can be generated based on the AQI. The AQI can include itemized factors, each used to determine a sub-index. The sub-index is used to determine the AQI. After assessing the factors indicated by the AQI, the overall integration of the multi-tenant application into the SAAS system is improved. The improved version of the multi-tenant application is distributed within the SAAS system, subsequently improving the overall functionality of the SAAS system.

The embodiments address a computer-centric and Internet-centric problem of a SAAS system management to qualify an application's integration to retain attention and lower churn, and further increase product engagement. The disclosed SAAS system may be implemented as computer programs or application software on one or more computing devices that process user features collected by a data management system.

Figure 1:
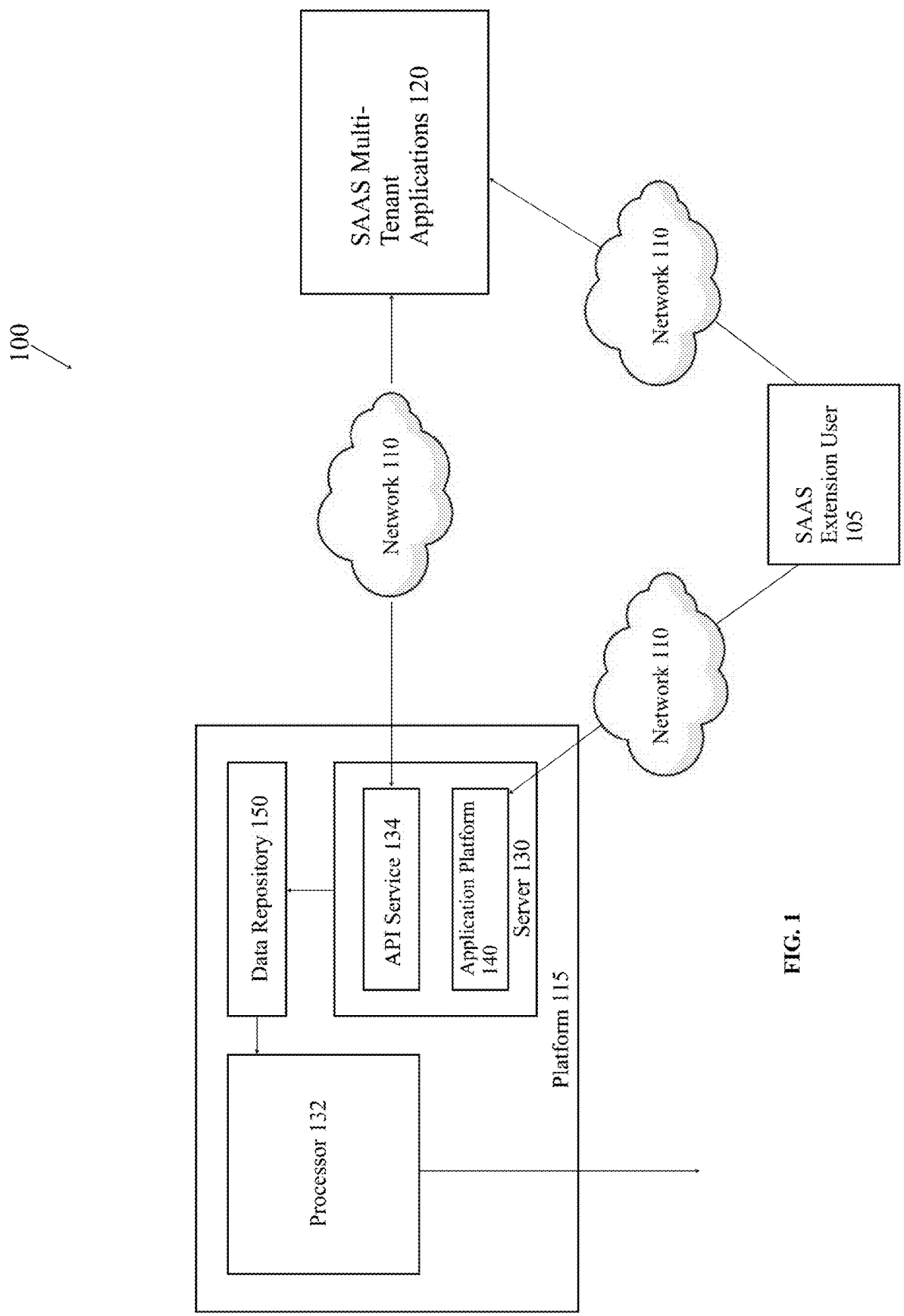
FIG. 1 illustrates a hardware structure of an example SAAS system, in accordance with some embodiments of the present disclosure.

FIG. 1 illustrates an example software as a service (hereinafter "SAAS") system 100 in which certain embodiments of the present disclosure are implemented. The example SAAS system 100 includes a SAAS multi-tenant application 120, a platform 115, and a SAAS extension user 105. The platform 115 includes a server 130, a data repository 150, and a processor 132. The server 130 can include an application platform Application Program Interface (hereinafter "API") service 134, and an application platform 140.

The SAAS multi-tenant application 120 can include a developer interface, used to facilitate user interaction with the API service 134 of the server 130. The SAAS multi-tenant application 120 can be accessed by any device configured to present user interfaces and receive inputs thereto. For example, the SAAS multi-tenant application 120 may accessed by a smartphone, a personal computer, a tablet, a laptop computer, a personal digital assistant (PDA), or any computing system that may be equipped with an interface.

The processor 132 may be implemented to determine an Application Quality Index (hereinafter "AQI"). The SAAS multi-tenant application 120 is connected to the application platform API service 134 via network 110. The platform 115 provides SAAS products or services by the server 130 to the SAAS extension user 105 and the SAAS multi-tenant application 120. The SAAS extension user 105 can utilize the services, such as financial management and tax return preparation and filing. The services can be provided via a browser application provided at a client device (not shown). Specific examples of SAAS products or services include, but are not limited to QuickBooks™, TurboTax™ standalone or online software products or services available from Intuit, Inc. and/or various other software systems known to those of skill in the art and/or as developed in the future.

The SAAS extension user 105 can access the application platform 140 via a standard platform user interface access over network 110. The SAAS extension user 105 can access the SAAS multi-tenant application 120 via network 110. The application platform API service 134 generates an API token for the SAAS extension user 105 and the SAAS multi-tenant application 120. The API token is authorized by the SAAS extension user 105. The API token is authenticated to fetch and push data of the SAAS extension user 105 to the SAAS multi-tenant application 120. The API token is also authenticated to access data by the SAAS extension user 105.

The network 110 can include the Internet and/or other public or private networks or combinations thereof. The processor 132 can be configured to generate an application sub-index, an AQI based on the sub-index, a multi-tenant application ranking based on the AQI, and a comparative analysis of multiple multi-tenant applications based on the same. The processor 132 is discussed in greater detail below.

The server 130 is depicted as a single device for ease of illustration, but those of ordinary skill in the art will appreciate that server 130 can be embodied in different forms for different implementations. For example, server 130 can include a plurality of servers communicating with each other through the network 110. Alternatively, the operations performed by the server 130 can be performed on a single server, as illustrated. In another example, one or more SAAS multi-tenant applications 120 communicate with the server 130. A single SAAS extension user 105 can subscribe to one or more SAAS multi-tenant applications 120. Furthermore, one or more SAAS extension users 105 can subscribe to the SAAS multi-tenant application 120.

The application platform 140 can be hosted on the server 130 or be a standalone platform. The SAAS multi-tenant application 120 is configured to work in conjunction or supplement the application platform 140. In some embodiments, the SAAS multi-tenant application 120 is accessible via a digital application distribution platform. The digital application distribution platform may otherwise be known as an "app store" or an application marketplace. Prior to publication on the digital application distribution platform, the SAAS multi-tenant application 120 undergoes an approval process with the digital application distribution platform. For example, the application may be examined for reliability, functionality, appropriate content, or other attributes before the application is approved for distribution through the app store.

The SAAS multi-tenant application 120 can find, study, use, and test APIs, provided by the API service 134. In some embodiments, the SAAS multi-tenant application 120 can include a developer portal, which is hosted remotely (e.g., by the server 130) or locally at the SAAS multi-tenant application 120. The developer portal may be accessed over the internet using a web browser external to or within a software development program.

An Application Quality Index (AQI) can be provided to the developer portal. In some embodiments, the AQI includes a scoring metric based on similar applications in the digital application distribution platform. In alternative embodiments, the AQI includes a scoring metric based on similar applications, generally available to integrate with the SAAS system 100. In some embodiments, the AQI can be an index between 1-100, generally representing the quality of the integration of the SAAS multi-tenant application 120 to the SAAS system 100. The AQI is determined by an algorithm that processes subset data from the data repository 150 to determine sub-indexes, and summarizes the sub-indexes, each with a unique weight factor.

The data can be related to APIs and/or performance of the SAAS multi-tenant application 120 within the SAAS system 100. The data subsets are retrieved from internal and/or external data sources in communication with the data repository 150. This is discussed in greater detail below.

While the various components of the SAAS system 100 are depicted separately in FIG. 1, one or more of the components can be implemented either together or separately. Moreover, certain functions may be distributed across a plurality of physical or virtual devices. Embodiments of the present disclosure may be implemented as one or more microservices provided through one or more backend servers (e.g., server 130). The components which provide an AQI (e.g., server 130 and the processor 132) may be the same or different than those which handle API calls and perform other API functionality (e.g., these other functions may be performed by additional servers which are not depicted).

Figure 2:
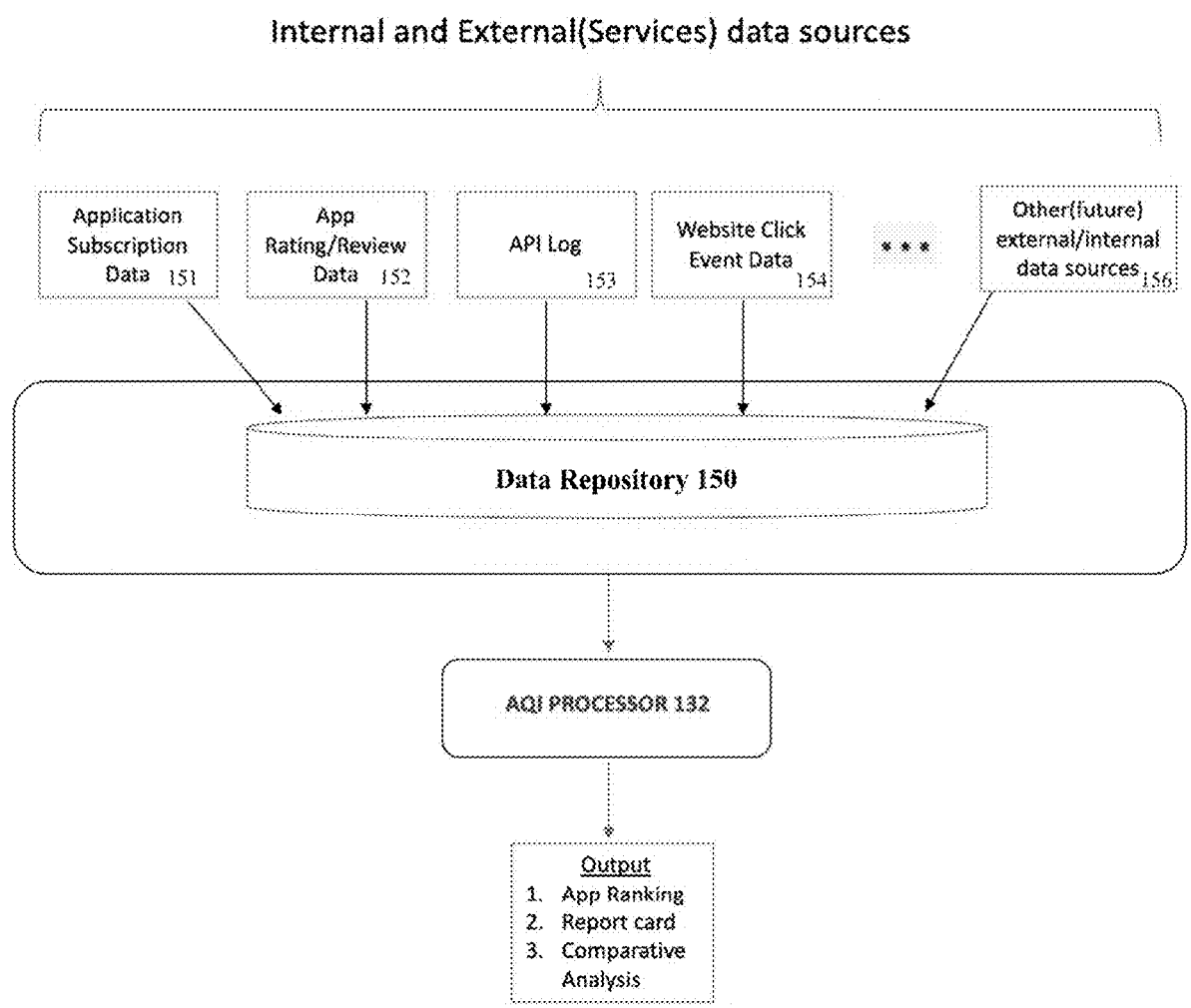
FIG. 2 illustrates an example data repository of FIG. 1, in accordance with some embodiments of the present disclosure.

FIG. 2 illustrates an example data repository 150 of FIG. 1, in accordance with some embodiments of the present disclosure. The data repository 150 receives data from, for example, internal and/or external data sources. The data from each of the repositories are factored and weighted to determine the AQI. For the purposes of illustration, the data repository 150 receives application subscription data 151, application rating/review data 152, API log data 153, website click event data 154, and other external/internal data 156. One or more of the data sources can be commonly located on a storage array (not shown). In alternative embodiments, each of the data sources are remote from one another. For example, an event-based data intake and query system may serve as a data source. The event-based data intake and query system may be provided by SPLUNK® ENTERPRISE developed by Splunk Inc., of San Francisco, Calif. Other event-based data intake and query systems can be implemented herein. Data from each of the data sources is processed by the processor 132 to determine an AQI for a multi-tenant application. The processor 132 can also generate an application sub-index, an AQI based on the sub-index, a multi-tenant application ranking based on the AQI, and a comparative analysis of multiple multi-tenant applications based on the same.

The application subscription data 151 includes customer specific data, customer retention data, and/or customer development data. Churn and yearly connection growth may be determined based on the received data. The processor 132 may determine a sub-index based on the received application subscription data 151. The sub-index may be used to determine the AQI. For example, the sub-index of the application subscription data 151 may be referred to as a Growth Rate Score. The Growth Rate Score can be weighted to determine the overall AQI.

The application rating/review data 152 includes application ratings received from an end user, overall rating of the application, content of the received ratings, and a number of end users subscribed to the application. The processor 132 may determine a sub-index based on the received application rating/review data 152. The sub-index may be used to determine the AQI. The sub-index of the application rating/ review data 152 may be referred to as an Average Rating Score and a Previous Year Rating Score. Both the Average Rating Score and the Previous Year Rating Score can be weighted, separately, to determine the overall AQI.

The API log data 153 includes API usage data from various websites, applications, servers, networks and mobile devices. An event includes a portion of the machine-generated data and is associated with a specific point in time. Events may be derived from "time series data," where the time series data includes a sequence of data points (e.g., performance measurements from a computer system, etc.) that are associated with successive points in time. The data processed to determine the API Error score may be refreshed on a weekly basis. For example, the API log data 153 provides API usage information for the SAAS multi-tenant application 120 (of FIG. 1). The processor 132 may determine a sub-index based on the received API log data 153. The sub-index is the number of API Errors divided by the total number of API calls. In some embodiments, batch errors are not considered. This sub-index is referred to as the API Error Score.

The sub-index may be used to determine the AQI Score. For example, the sub-index of the API log data 153 may be referred to as an API Error Score and/or a Connection/Disconnection Score. Both the API Error Score and the Connection/Disconnection Score can be weighted, separately, to determine the overall AQI Score.

The website click-event data 154 includes first-time user (FTU) experience data, which includes a ratio of customers using the application versus the number of customers who are viewing the application. Furthermore, the website click-event data 154 includes the number of click-events generated from a user interaction. As discussed above with reference to FIG. 1, the server 130 grants the SAAS multi-tenant application 120 access to the API Service 134 via access tokens, typically provided to the SAAS extension user 105. The access tokens include a one-time access token and a refresh token. If the SAAS multi-tenant application 120 code simply requires the one-time access token, and does not regularly process the refresh token, the SAAS extension user 105 can be forced to constantly authenticate the one-time access token. As a result, the SAAS extension user 105 may be deterred from using the SAAS multi-tenant application 120 due to constant authentication. This deterrence leads to a poor first-time user experience. The processor 132 can determine a sub-index based on the received website click event data 154. The sub-index is used to determine the AQI. For example, the sub-index of the website click-event data 154 may be referred to as a Click/Visitor Score. The Click/Visitor Score is weighted to determine the overall AQI.

Figure 3:
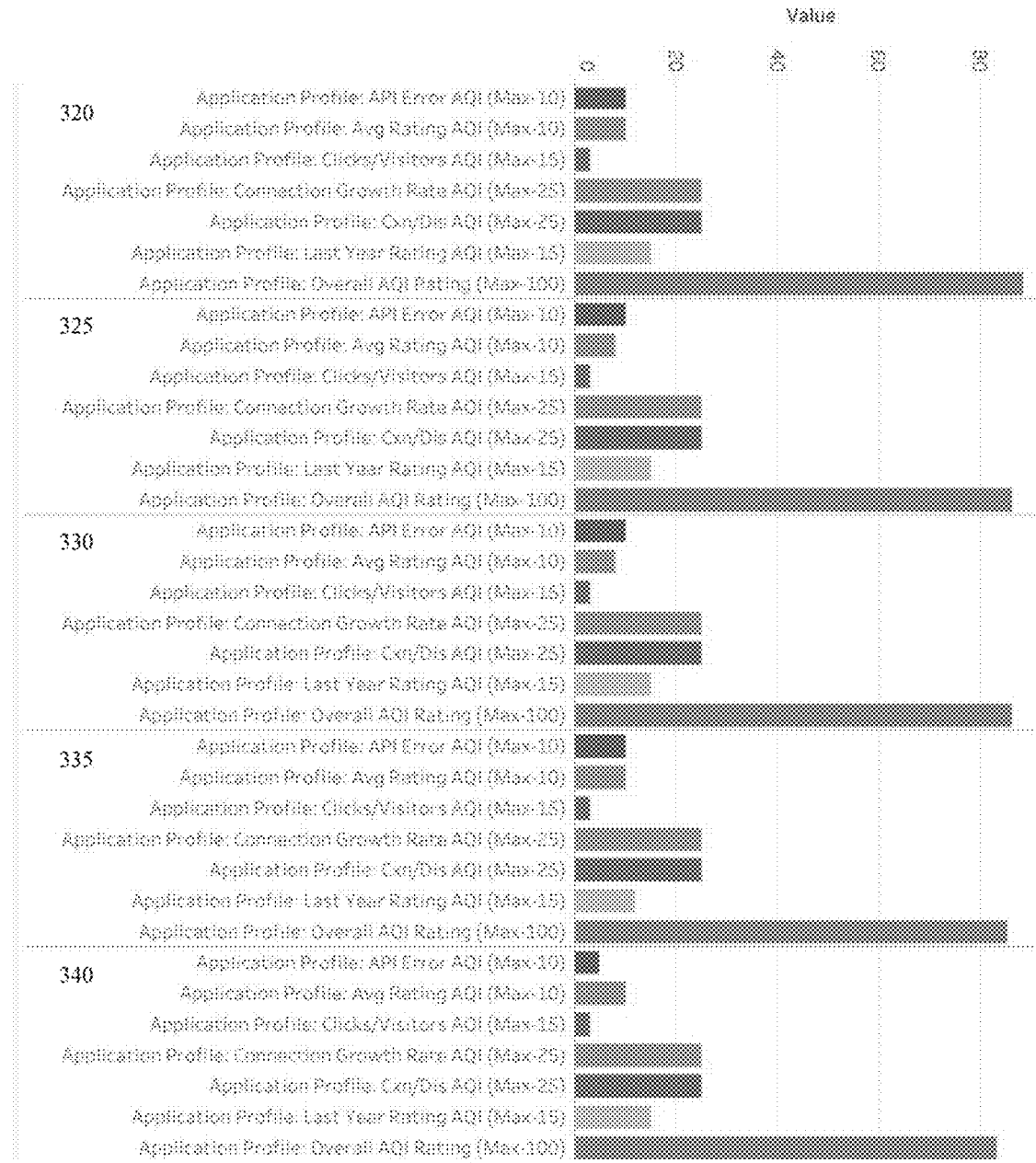
FIG. 3 illustrates an example AQI Score based on the weighted data of FIG. 2, in accordance with some embodiments of the present disclosure.

FIG. 3 illustrates an example AQI based on the weighted data of FIG. 2, in accordance with some embodiments of the present disclosure. FIG. 3 illustrates SAAS multi-tenant applications 320, 325, 330, 335, and 340, each with a set of sub-indexes and a corresponding AQI. The sub-indexes are illustrated as the Growth Rate Score, Average Rating Score, Previous Year Rating Score, API Error Score, Connection/Disconnection Score, and Clicks/Visitors Score. Each of the sub-indexes are each weighted by the processor 132 to determine the AQI. The weight of each sub-index can be preassigned by the server 130. Table 1 is provided below to illustrate the weight of each sub-index:

TABLE 1

| 1. Cxn/Dis 25% | | 2. Last yr rating 15% | 3. Overall Rating 10% | 4. API Error 10% | 5. Connection Growth 25% | | 6. Clicks/Visitors 15% | |
| --- | --- | --- | --- | --- | --- | --- | --- | --- |
| >95 percentile | 25 | 15 | 10 | 10 | >95 percentile | 25 | >95 percentile | 15 |
| 90 <= X < 95 | 20 | 12 | 8 | 0 | 90 < X <= 95 | 20 | 90 < X <= 95 | 12 |
| 75 < X <= 90 | 15 | 9 | 6 | | 75 < X <= 90 | 15 | 75 < X <= 90 | 9 |
| 50 <= X < 75 | 10 | 6 | 4 | | 50 < X <= 75 | 10 | 50 < X <= 75 | 6 |
| X < 50 | 5 | 3 | 2 | | X < 50 | 5 | X <= 50 | 3 |

The Connection/Disconnection Score (column 1 of Table 1) is assigned a weighted value between 5-25 of the AQI (100). The Connection/Disconnection Score is the total number of connections divided by the disconnections of users to the application. The resulting percentile is used to determine a score between 5 and 25. For example, if the percentile is greater than 95, then the Connection/Disconnection Score is assigned a full weighted value of 25. If the percentile is greater than or equal to 90 and less than 95, then the Connection/Disconnection Score is assigned a weighted value of 20. If the percentile is greater than 75 and less than or equal to 90, then the Connection/Disconnection Score is assigned a weighted value of 15. If the percentile is greater than or equal to 50 and less than 75, then the Connection/Disconnection Score is assigned a weighted value of 10. If the quotient is less than 50, then the Connection/Disconnection Score is assigned a weighted value of 5.

The Previous Year Rating Score (column 2 of Table 1) is assigned a weighted value between 3-15 of the AQI (100). In some embodiments, applications without ratings receive a Previous Year Rating Score with an assigned weighted value of 0. The Average Rating Score (column 3 of Table 1) is assigned a weighted value between 2-10 of the AQI (100). The Average Rating Score can be based on a full calendar year review.

The API Error Score (column 4 of Table 1) is assigned a weighted value between 0-10 of the AQI (100). The API Error Score is the number of API Errors divided by the total number of API calls. The resulting percentage is used to determine a score between 0 and 10. For example, if the resulting percentage is less than 2% then the API Error Score is assigned a weighted value of 10 of the AQI (100). If the resulting percentage is greater than 3% then the API Error Score is assigned a weighted value of 0 of the AQI (100).

The Click/Visitor Score (column 6 of Table 1) is assigned a weighted value between 3-15 of the AQI (100). The Click/Visitor Score is the number of initial clicks divided by the total number of application visitors. The resulting percentage is used to determine a score between 3 and 15. For example, if the percentile is greater than 95, then the Click/Visitor Score is assigned a full weighted value of 15. If the percentile is greater than 90 and less than or equal to 95, then the Click/Visitor Score is assigned a weighted value of 12. If the percentile is greater than 75 and less than or equal to 90, then the Click/Visitor Score is assigned a weighted value of 9. If the percentile is greater than 50 and less than or equal to 75, then the Click/Visitor Score is assigned a weighted value of 6. If the quotient is less than or equal to 50, then the Click/Visitor Score is assigned a weighted value of 3.

The Growth Rate Score (column 5 of Table 1) is assigned a weighted value between 5-25 of the AQI (100) based on, for example, a gross quarterly connection growth. For example, if the gross quarterly connection growth is in the 95 percentile, then the Growth Rate Score is assigned a full weighted value of 25. If the gross quarterly connection growth is greater than 90 and less than or equal to 95, then the Growth Rate Score is assigned a weighted value of 20. If the gross quarterly connection growth is greater than 75 and less than or equal to 90, then the Growth Rate Score is assigned a weighted value of 15. If the gross quarterly connection growth is greater than 50 and less than or equal to 75, then the Growth Rate Score is assigned a weighted value of 10. If the gross quarterly connection growth is less than or equal to 50, then the Growth Rate Score is assigned a weighted value of 5.

TABLE 2

| Attributes | AQI |
| --- | --- |
| 1. Cxn/Dis | 25% |
| 2. Last yr rating | 15% |
| 3. Overall Rating | 10% |
| 4. API Error | 10% |
| 5. Connection Growth | 25% |
| 6. Clicks/Visitors | 15% |
| | 100% |

Table 2 is provided to illustrate the sum of the weight of each sub-index equals to 100, which is the total AQI. For the purposes of illustration, the following formula is implemented to determine the AQI:

AQI=(Weight % of *Cxn/Dis*)+(Weight % API Error)+(Weight % Connection Growth)+(Weight % Clicks/Visitors)+(Weight % Last Yr Rating)+ (Weight % of Overall Rating)

Referring to FIG. 3, the SAAS multi-tenant application 320 is assigned the full weight of each sub-index, apart from the Connection/Disconnection Score. Instead of being assigned a total of 15 of the Connection/Disconnection Score towards the AQI, the SAAS multi-tenant application 320 is only assigned 3 towards the AQI. Accordingly, the AQI of the SAAS multi-tenant application 320 is 88/100. Similarly, the SAAS multi-tenant application 325 is assigned the full weight of each sub-index apart from the Average Rating Score and the Connection/Disconnection Score. Instead of being assigned a total 10 of the Connection/Disconnection Score towards the AQI, the SAAS multi-tenant application 320 is assigned 8 towards the AQI. Furthermore, the SAAS multi-tenant application 325 is assigned 3 of the Connection/Disconnection Score towards the AQI. Accordingly, the AQI of the SAAS multi-tenant application 320 is 86/100. The SAAS multi-tenant application 330 has the same AQI Score, based on identical sub-indexes.

The SAAS multi-tenant application 330 suffers from various insufficiencies resulting in an AQI of 87/100. Similarly, the SAAS multi-tenant application 335 also suffers from various insufficiencies resulting in an AQI of 85/100. The SAAS multi-tenant application 340 suffers from various insufficiencies resulting in an AQI of 82/100. Based on the illustrated AQI, the SAAS multi-tenant applications is ranked as presented.

Figure 4:
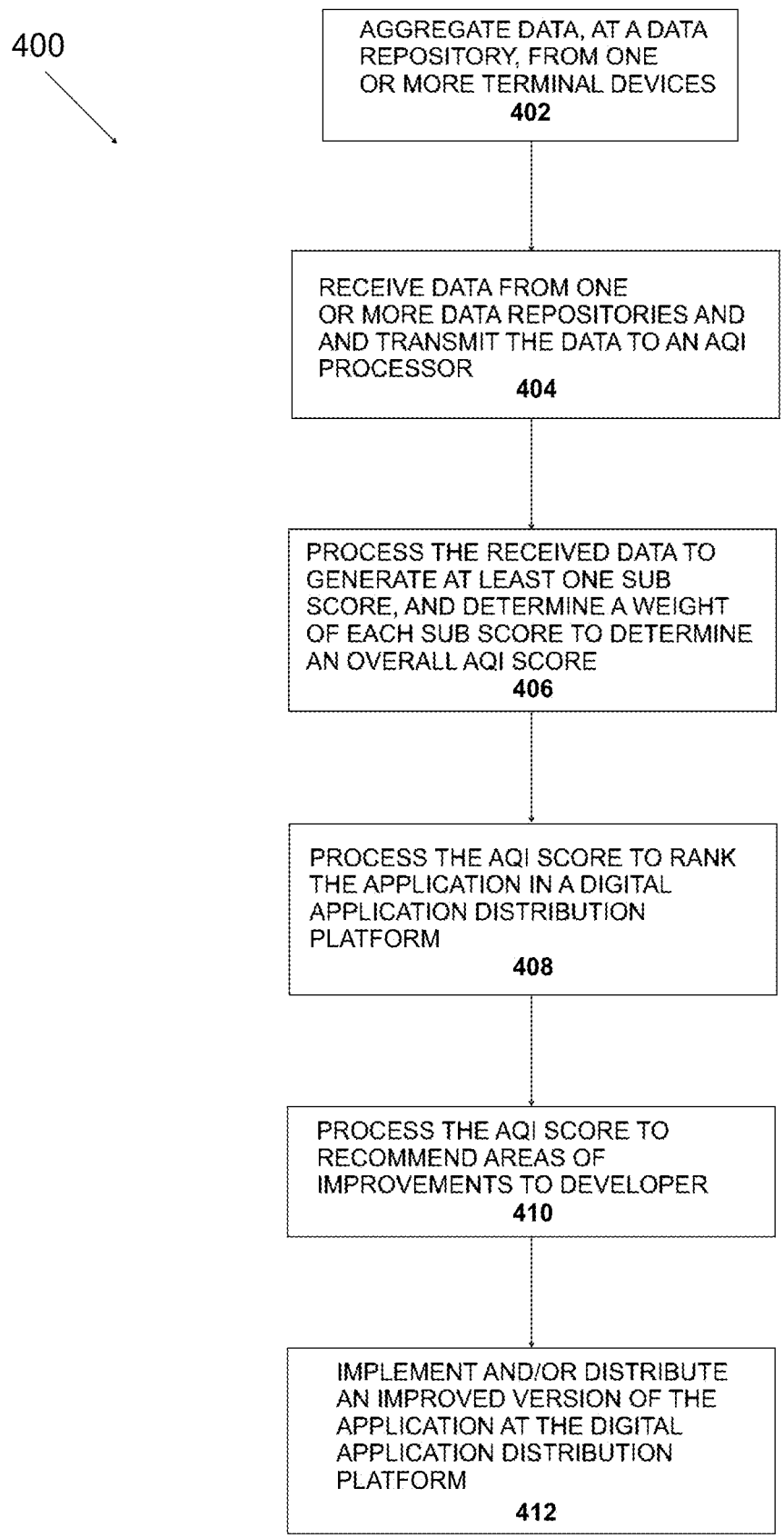
FIG. 4 is a flowchart illustrating an example process to provide an application integration score in a digital application distribution platform, in accordance with some embodiments of the present disclosure.

FIG. 4 is a flowchart illustrating an example process 400 to provide the AQI in the SAAS system 100, in accordance with some embodiments of the present disclosure. The process 400 may be configured as computer programs (e.g., software) executed on one or more computers, in which the systems, model components, processes, and embodiments described below can be implemented. At 402, at least one data repository collects data from, for example, various terminal devices. For the purposes of this illustration, the terminal devices are configured as data sources. One or more of the data sources can be commonly located on a common storage array (not shown). Alternatively, one or more of the data sources may be remote from one another. For example, the application rating/review data 152 (of FIG. 2) may be received by the server 130 via a digital application distribution platform.

In some embodiments, the data repository 150 may be communicatively coupled to independent servers, or storage arrays not illustrated in the SAAS system 100. For example, the application rating/review data 152 is received from social media integrated platforms. The received data includes, for example, user-uploaded submissions referencing part or all of the application name, title, or likeness.

At 404, application server 130 accesses and transmits data from the data repository 150 to the processor 132. The processor 132 processes the data to determine at least one sub-index, based on the content of the data. The Growth Rate Score, Average Rating Score, Previous Year Rating Score, API Error Score, Connection/Disconnection Score, and Clicks/Visitors Score are each weighted by the processor 132 to determine relevant sub-indexes.

At 408, the sub-index is weighted to determine the overall AQI. In some embodiments, the weight of each sub-index can be predetermined. For example, the API Error Score is assigned a total weight of 10 out of the AQI (100). The Average Rating Score is assigned a total weight of 10 out of the AQI (100). The Click/Visitor Score is assigned a total weight of 15 out of the AQI (100). The Growth Rate Score is assigned a total weight of 25 out of the AQI (100). The Connection/Disconnection Score is assigned a total weight of 25 out of the AQI (100). Finally, the Previous Year Rating Score is assigned a total weight of 25 out of the AQI (100). The sum of the weight of each sub-index equals to 100, which is the total AQI. The weight of each sub-index may be predetermined based on internal priorities of the SAAS system 100. In other embodiments, the weight of each sub-index may be determined using a statistical learning system. For example, the statistical learning model is configured to learn from a training set of data. Every point in the training is an input-output pair, where the input maps to an output. The learning problem consists of inferring the function that maps between the input and the output, such that the learned function can be used to predict the output from a future input. An assigned weight value for the sub-indexes can be received as input to generate a statistical representation of the weighted value of at least one sub-index.

For example, the server 130 can provide an AQI for a SAAS multi-tenant application recently introduced into the SAAS system 100. Due to being recently introduced into the SAAS system 100, the SAAS multi-tenant application does not include relevant application rating/review data 152. Therefore, there isn't enough available data to determine the Previous Year Rating Score and the Average Rating Score. The AQI of the SAAS multi-tenant application would suffer as a result of the lack of data under the present sub-index weighting. In these instances, the statistical learning system is trained to learn model weights, adjust the weights of the relevant sub-indexes and process the remaining data subsets to generate a relevant AQI. For example, the API Error Score is assigned a total weight between 0-20 out of the AQI (100). The Average Rating Score is assigned a total weight of 0 out of the AQI (100). Similarly, the Previous Year Rating Score is assigned a total weight of 0 out of the AQI (100). The Click/Visitor Score is assigned a total weight of 0-20 out of the AQI (100). The Growth Rate Score is assigned a total weight of 0-35 out of the AQI (100). The Connection/Disconnection Score is assigned a total weight of 0-35 out of the AQI (100). The sum of the weight of each sub-index equals to 100, which is the total AQI. The weight of each sub-index is adjusted to account for the lack of relevant data in determining the Previous Year Rating Score and the Average Rating Score.

At step 408, the AQI is interpreted and used by the server 130 to, for instance, rank the SAAS multi-tenant application with respect to similar SAAS multi-tenant applications in the SAAS system 100. In some embodiments, the ranking corresponds to the ordered listing of SAAS multi-tenant applications in the SAAS system 100. In other embodiments, the ranking corresponds to a preferred or separately highlighted ordered listing of applications in the SAAS system 100. The server 130 may have access to all the data and factors, including the weighting of each sub-index used to determine the AQI.

At step 410, an improved version of the multi-tenant SAAS application 120 can be generated based on the AQI. The AQI can include itemized factors, each used to determine a sub-index. As indicated above, each sub-index is used to determine the AQI. The server 130 is operable to provide the itemized factors to the SAAS multi-tenant application 120 via the developer interface, which is used to facilitate user interaction with the API service 134 of the server 130. The server 130 can also provide poignant suggestions based on the sub-indexes. For example, the server 130 can provide areas of improvements based on the application's integration to an API token provided by the API Service 134 to the SAAS multi-tenant application 120 to build and test software, and the like. The server 130 can generally provide areas of improvements based on information about a specific version of the SAAS multi-tenant application 120. An improved SAAS multi-tenant application 120 can be generated based on the AQI.

After assessing the factors indicated by the AQI the overall integration of the multi-tenant application 120 into the SAAS system is improved, at step 412. The improved version of the multi-tenant application is distributed within the SAAS system 100, subsequently improving the overall functionality of the SAAS system 100. The improved version of the SAAS multi-tenant application 120 may be made available to the SAAS extension user 105. The improved SAAS multi-tenant application 120 generally includes revised code or additional code. An AQI may be provided for the improved version of the SAAS multi-tenant application 120. An improved version of the SAAS multi-tenant application can be distributed within the SAAS system 100, improving the overall functionality of the SAAS system 100.

Figure 5:
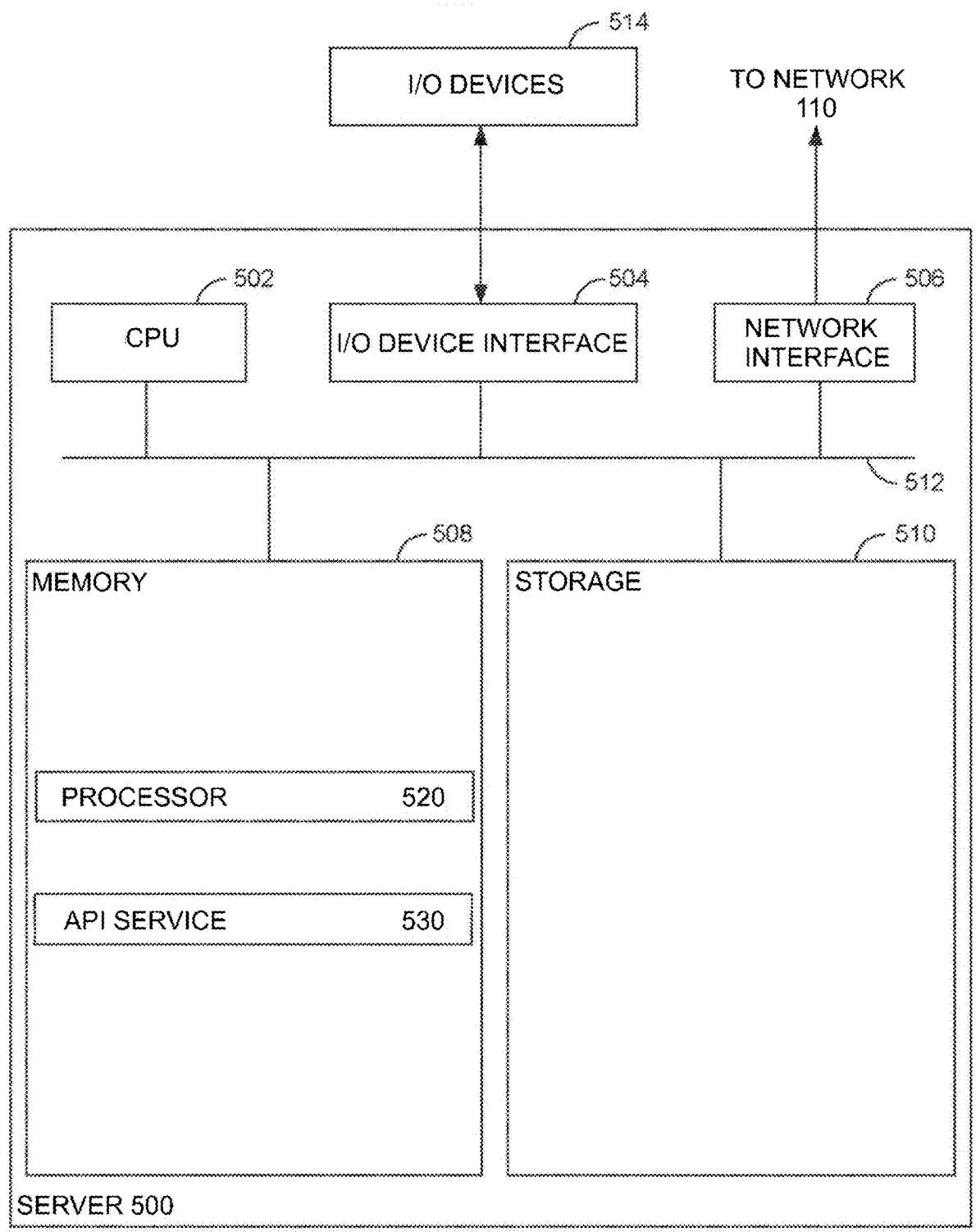
FIG. 5 illustrates an example of an electronic system with which the server device of FIG. 1 may be implemented, in accordance with some embodiments of the present disclosure.

FIG. 5 illustrates an example of an electronic system 500 with which a server 130 may be implemented. For example, as shown, the system 500 includes, without limitation, a central processing unit (CPU) 502, one or more I/O device interfaces 504 which may allow for the connection of various I/O devices 514 (e.g., keyboards, displays, mouse devices, pen input, etc.) to the system 500, network interface 506, a memory 508, storage 510, and an interconnect 512.

CPU 502 may retrieve and execute programming instructions stored in the memory 508. Similarly, the CPU 502 may retrieve and store application data residing in the memory 508. The interconnect 512 may transmit programming instructions and application data, among the CPU 502, I/O device interface 504, network interface 506, memory 508, and storage 510. CPU 502 is included to be representative of a single CPU, multiple CPUs, a single CPU having multiple processing cores, and the like. Additionally, the memory 508 is included to be representative of a random-access memory. Furthermore, the storage 510 may be a disk drive, solid state drive, or a collection of storage devices distributed across multiple storage systems. Although shown as a single unit, the storage 510 may be a combination of fixed and/or removable storage devices, such as fixed disc drives, removable memory cards or optical storage, network attached storage (NAS), or a storage area-network (SAN).

As shown, memory 508 may include a processor 520 and an API service 530. The API service 530 may handle API calls received over network interface 506. For example, API service 530 may perform basic API functionality of identifying data and/or code relevant to an API call, retrieving and/or executing the data and/or code, and providing data and/or code in response to the API call. In some embodiments, API service 530 may identify a relevant API variation, and may respond to the API call using data and/or code associated with the relevant API variation.

The processor 520 may, for instance, receive, handle, and respond to AQI information requests (e.g., received from network 110 via network interface 506) based on the integration of the SAAS multi-tenant application with the API service 530. The processor 520 may identify relevant data, process the received data to determine at least one subset score, and determine a weight of the subset score to determine an overall AQI. The processor 520 may also provide the sub-index and relevant information in response.

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether a advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the embodiment" shall not be construed as a generalization of any inventive subject matter disclosed herein and shall not be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples may include a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain or store a program.

While the foregoing is directed to embodiments of the present disclosure, other and further embodiments of the disclosure may be devised without departing from the basic scope thereof, and the scope thereof is determined by the claims that follow.

What is claimed is:

1. A system for determining an Application Quality Index (AQI) of a software-as-a-service (SAAS) multi-tenant application to a SAAS system, said system comprising:
   a first computing device comprising a processor, the first computing device being in communication with the SAAS multi-tenant application and being configured to:
   access data at a data repository, the accessed data comprises at least connection/disconnection data and Application Program Interface (API) error data of the SAAS multi-tenant application;
   process the accessed data to generate two or more sub-indexes, the two or more sub-indexes comprising at least a first sub-index based on the connection/disconnection data and a second sub-index based on the API error data, wherein the first sub-index is assigned a weighted value based on content of the connection/disconnection data and the second sub-index is assigned a weighted value based on content of the API error data;
   generate the AQI based on the weighted value of the two or more sub-indexes, wherein the AQI comprises a numerical score between a predetermined range, the AQI is a summation of the two or more sub-indexes;
   send the generated AQI to the SAAS multi-tenant application; and
   receive an update to the SAAS multi-tenant application based on the generated AQI.

2. The system of claim 1, wherein the first computing device is further configured to:
   dynamically determine the weighted value of the two or more sub-indexes using a statistical learning system.

3. The system of claim 2, wherein determining the weighted value of the two or more sub-indexes using the statistical learning system comprises:
   receiving as input, model weighted values for the two or more sub-indexes;
   adjusting the weighted values of the two or more sub-indexes based on the model weighted values for the two or more sub-indexes; and
   processing the two or more sub-indexes using the adjusted weighted values to generate the AQI.

4. The system of claim 1, wherein the first computing device is further configured to:
   process the generated AQI to rank the SAAS multi-tenant application in the SAAS system among two or more other SAAS multi-tenant applications available in the SAAS system.

5. The system of claim 1, wherein the AQI comprises itemized factors, each factor used to determine the two or more sub-indexes.

6. The system of claim 5, wherein the SAAS multi-tenant application comprises a developer interface used to facilitate user interaction with an API service of the computing device and configured to receive the itemized factors of the AQI.

7. The system of claim 1, wherein the two or more sub-indexes further comprises at least one of: a third sub-index based on an average rating data, a fourth third sub-index based on a click/visitor data, a fifth sub-index based on a growth rate data, and a sixth sub-index based on a previous year rating data.

8. A computing system comprising:
   one or more processors; and
   one or more non-transitory computer-readable storage devices storing computer-executable instructions, the instructions operable to cause the one or more processors to perform operations comprising:
   accessing data at a data repository, the accessed data comprises at least connection/disconnection data and Application Program Interface (API) error data of the SAAS multi-tenant application;
   processing the accessed data to generate two or more sub-indexes, the two or more sub-indexes comprising at least a first sub-index based on the connection/disconnection data and a second sub-index based on the API error data, wherein the first sub-index is assigned a weighted value based on content of the connection/disconnection data and the second sub-index is assigned a weighted value based on content of the API error data;
   generating the AQI based on the weighted value of the two or more sub-indexes, wherein the AQI comprises a numerical score between a predetermined range, the AQI is a summation of the two or more sub-indexes;
   sending the generated AQI to the SAAS multi-tenant application; and
   receiving an update to the SAAS multi-tenant application based on the generated AQI.

9. The computing system of claim 8, wherein the one or more processors is further configured to:
   dynamically determining the weighted value of the two or more sub-indexes using a statistical learning system.

10. The computing system of claim 9, wherein determining the weighted value of the two or more sub-indexes using the statistical learning system comprises:
    receiving as input, model weighted values for the two or more sub-indexes;

adjusting the weighted values of the two or more sub-indexes based on the model weighted values for the two or more sub-indexes; and processing the two or more sub-indexes using the adjusted weighted values to generate the AQI.

11. The computing system of claim 8, further comprising processing the generated AQI to rank the SAAS multi-tenant application in the SAAS system among two or more other SAAS multi-tenant applications available in the SAAS system.

12. The computing system of claim 8, wherein the AQI comprises itemized factors, each factor used to determine the two or more sub-indexes.

13. The computing system of claim 12, wherein the SAAS multi-tenant application comprises a developer interface used to facilitate user interaction with an API service of the computing device and configured to receive the itemized factors of the AQI.

14. The computing system of claim 8, wherein the two or more sub-indexes further comprises at least one of: a third sub-index based on an average rating data, a fourth third sub-index based on a click/visitor data, a fifth sub-index based on a growth rate data, and a sixth sub-index based on a previous year rating data.

\* \* \* \* \*